Feb. 25, 1947.                F. J. BINDA                2,416,510
                COMPOSITE PLASTIC SHEET FOR USE IN THE
                FORMATION OF LIGHT POLARIZING IMAGES
                        Filed April 23, 1943

Frederick J. Binda
INVENTOR.

BY Donald L. Brown
Attorney

Patented Feb. 25, 1947

2,416,510

UNITED STATES PATENT OFFICE 2,416,510

COMPOSITE PLASTIC SHEET FOR USE IN THE FORMATION OF LIGHT-POLARIZING IMAGES

Frederick J. Binda, Cambridge, Mass., assignor to Polaroid Corporation, Cambridge, Mass., a corporation of Delaware Application April 23, 1943, Serial No. 484,200

2 Claims. (Cl. 88—65)

This invention relates to a composite plastic sheet or film adapted for use in the production of light-polarizing material and stereoscopic images comprising light-polarizing material.

It has been proposed to provide a composite sheet or film for the above purpose comprising a layer of polyvinyl alcohol, particularly molecularly oriented polyvinyl alcohol, bonded securely to another layer of a transparent plastic material of different physical properties, and particularly such a composite sheet wherein the second-named layer is resistant to forces or conditions disadvantageously affecting said first-named layer. For example, said first-named layer may comprise molecularly oriented polyvinyl alcohol and said second-named layer may comprise substantially non-hydrophilic material such as cellulose acetate having its molecules in their normal condition of heterogeneous orientation and having the surface thereof adjacent said polyvinyl alcohol layer at least partially converted to regenerated cellulose.

It is one object of the present invention to provide new and improved composite plastic sheets and films of the above type, and particularly a new and improved bond between said polyvinyl alcohol layer and said second-named layer.

Another object of the invention is to provide a composite sheet for use in the formation of light-polarizing images comprising a sheet of substantially non-hydrophilic material such as cellulose acetate or cellulose acetate butyrate and having at least one surface thereof partially regenerated to hydrophilic material and superimposed upon each such surface and integral with the sheet a plurality of layers of polyvinyl alcohol, each such outermost layer of polyvinyl alcohol having its molecules in a substantially oriented condition and each such inner layer of polyvinyl alcohol adjacent said sheet having its molecules heterogeneously arranged.

A further object is to provide new and improved products and particularly a composite plastic sheet or film of the above type characterized by the strength of the bond between said polyvinyl alcohol layer and said supporting layer.

Other objects and advantages will in part be apparent and in part be pointed out in the course of the following description of one or more embodiments of the invention, which are given as non-limiting examples, in connection with the accompanying drawings, in which.

It has recently been discovered that dichroic light polarizers and dichroic images may be formed by applying a dichroic dye or stain to the surface of a sheet of suitably molecularly oriented transparent plastic such as polyvinyl alcohol. Similarly, dichroic stereoscopic images may be produced by forming each image by applying a dichroic dye or stain to a separate molecularly oriented sheet of polyvinyl alcohol and then superimposing the two sheets with their directions of molecular orientation at right angles to each other. Alternatively, there may first be provided a sheet of plastic material whose outer surfaces comprise polyvinyl alcohol molecularly oriented in the proper directions, and the images may then be superimposed by printing one on one surface of the sheet and the other on the other surface. Preferred results are obtained if the molecular orientation be brought about by stretching the sheet to two or more times its original length before applying the dichroic stain thereto, but difficulty has been encountered with such sheets by reason of the fact that they tend to shrink after stretching, which results in curling and other undesirable effects.

It has been discovered that improved results are obtained if the sheet of molecularly oriented polyvinyl alcohol is laminated to a second sheet of a transparent plastic of different physical properties, and the present invention is concerned with the production of such composite sheets. For example, Fig. 1 of the drawings herein shows a composite sheet 10 comprising a molecularly oriented polyvinyl alcohol layer 12 bonded to a layer 14 of a different plastic material such as cellulose acetate. Layer 12 will preferably first be stretched, for example in the direction indicated by arrow 15, and layer 14 will preferably not be stretched and hence be in its normal condition of heterogeneous molecular orientation.

Figure 1:
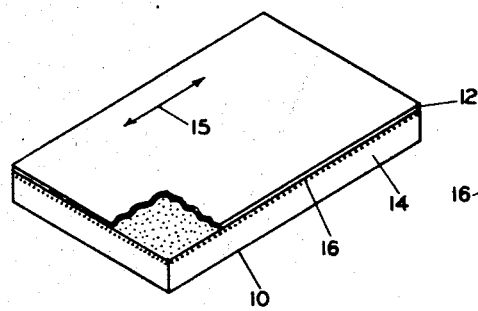
Figure 1 is a diagrammatic view in perspective, partly broken away, showing a composite sheet constituting an embodiment of the invention.

In the preferred embodiment of the product of the present invention, if layer 12 comprises stretched polyvinyl alcohol, layer 14 will comprise unoriented or otherwise differently oriented material which is substantially less hydrophilic than polyvinyl alcohol, for example cellulose acetate, cellulose acetate butyrate, polyvinyl acetal or the like. As is indicated in Fig. 1, stretched layer 12 should be relatively thin, for example .0005 to .002 of an inch in thickness, and layer 14 will be substantially thicker, for example .005 of an inch. It is to be understood, however, that these relative dimensions are given merely as illustrative of a suitable combination, and the invention is not to be construed as in any way limited thereto.

Considerable difficulty has been encountered heretofore in obtaining a satisfactory bond between a hydrophilic material such as polyvinyl alcohol and non-hydrophilic material, and one object of the present invention is to provide a method for effecting such a bond. Reasonably satisfactory results have been obtained by first treating the surface of a sheet of non-hydrophilic material to convert it at least partially to hydrophilic material, as is indicated by the stippling at 16 in Fig. 1. This may be done, for example, in the case of cellulose acetate by treating the surface with a suitable hydrolyzing or deacetalating agent, such as sodium hydroxide, which will convert the surface of the sheet to regenerated cellulose. A sheet of polyvinyl alcohol may then be readily bonded to the converted surface of the cellulose acetate by means either of water or a water solution of polyvinyl alcohol. In accordance with the present invention, however, it has been discovered that greatly superior results are obtained if the converted surface of sheet 14 be coated with a solution of polyvinyl alcohol and permitted to dry before polyvinyl alcohol layer 12 is bonded thereto.

The invention is in no way limited to the use in layer 14 of the specific materials mentioned above. On the contrary, any similar material may be used which will bond to polyvinyl alcohol or which may have its surface converted to hydrophilic material to which polyvinyl alcohol will more readily bond. Examples of such suitable materials include other cellulose esters and ethers such as cellulose nitrate and ethyl cellulose, derivatives of polyvinyl alcohol such as the acetals and ketals and organic esters of polyvinyl alcohol, and polymerized esters of acrylic and methacrylic acid and their derivatives.

Particularly satisfactory results for the purposes of the invention may be obtained with a sheet of polyvinyl acetal which has one surface at least partially converted to polyvinyl alcohol by means of a suitable hydrolyzing agent such as a dilute solution of a mineral acid such as sulphuric acid or hydrochloric acid. Many similarly useful materials and modifications will doubtless be apparent to those skilled in the art and are to be understood as coming within the scope of the invention.

Figure 2:
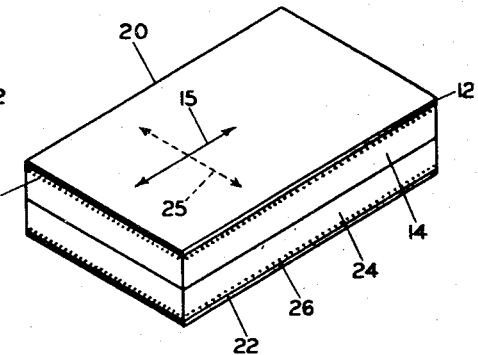
Fig. 2 is a view similar to Fig. 1 showing a composite sheet constituting another embodiment of the invention.

Fig. 2 shows another embodiment of the composite sheet of the invention which is particularly adapted for the reproduction of stereoscopic images formed by means of a suitable dichroic dye or stain. In Fig. 2, it is assumed that composite sheet 20 has been formed by laminating to composite sheet 10 shown in Fig. 1 a similar composite sheet comprising a layer 22 of polyvinyl alcohol and a layer 24 of non-hydrophilic plastic material having a partially regenerated surface, as is indicated by stippling 26. If, for example, layers 14 and 24 comprise cellulose acetate or like material, they may be laminated conveniently by means of acetone or a similar solvent. In Fig. 2 it is assumed that layer 22 has been stretched in the direction indicated by arrow 25. That is to say, the two composite sheets are so put together that the directions of stretch in layers 12 and 22 are at right angles to each other. Accordingly, if stereoscopic images are formed in sheet 20 by means of dichroic dyes, the image formed in layer 12 will have its polarizing axis at right angles to the axis of the image formed in layer 22, as will be explained in greater detail in connection with Fig. 3.

Figure 3:
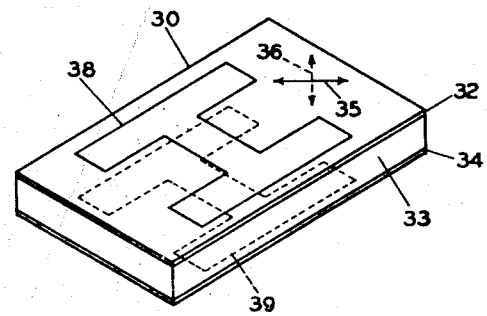
Fig. 3 is a diagrammatic view in perspective showing a sheet similar to the type shown in Fig. 2 and having a pair of dichroic images formed therein.

Fig. 3 shows diagrammatically a composite sheet of the type shown in Fig. 2 and having a dichroic stereoscopic image formed therein. In Fig. 3 sheet 30 comprises a pair of layers 32 and 34 of molecularly oriented polyvinyl alcohol bonded to a center layer 33 which corresponds to double central layer 14, 24 in Fig. 2. For example, layer 33 may comprise cellulose acetate which has both surfaces converted to regenerated cellulose, or it may comprise a pair of layers each having one surface regenerated to hydrophilic material and having their unconverted surfaces bonded together. Layer 32 is represented as having been stretched in the direction indicated by arrow 35, namely, at 45 degrees to the edges thereof, and layer 34 is represented as having been stretched in the direction indicated by arrow 36, namely, at 90 degrees to the direction of stretch of layer 32. This is the preferred angular relation between the directions of stretch in the two sheets, but it is to be understood that the invention is not limited to this arrangement, as is indicated by the relative positions of arrows 15 and 25 in Fig. 2.

In Fig. 3, polyvinyl alcohol layer 32 is represented as having formed thereon an image 38 constituting one image, for example the right-eye image, of a stereoscopic pair. Similarly, layer 34 has formed thereon an image 39 representing the left-eye image of a stereoscopic pair. Images 38 and 39 may be formed in layers 32 and 34, respectively, by means of any suitable dichroic dye or stain, such for example as a polyiodide stain or a suitable direct cotton dye or dyes. When, therefore, sheet 30 is viewed through suitable analyzers, one eye of the observer will see only image 38 and the other eye will see only image 39, and a three-dimensional effect will accordingly be produced. It is to be understood that images 38 and 39 may be formed in layers 32 and 34 at any desired time during assembly of the device. However, according to the preferred practice, composite sheet 30 will first be assembled and the images may then be formed thereon, preferably simultaneously, by applying to each surface thereof a colloid relief which has been imbibed in the desired dichroic dye and which bears thereon one of the desired images. It is to be understood, however, that the invention is not limited to the use of a sheet thereof in connection with dichroic images, nor to any particular way of forming images thereon.

Figure 4:
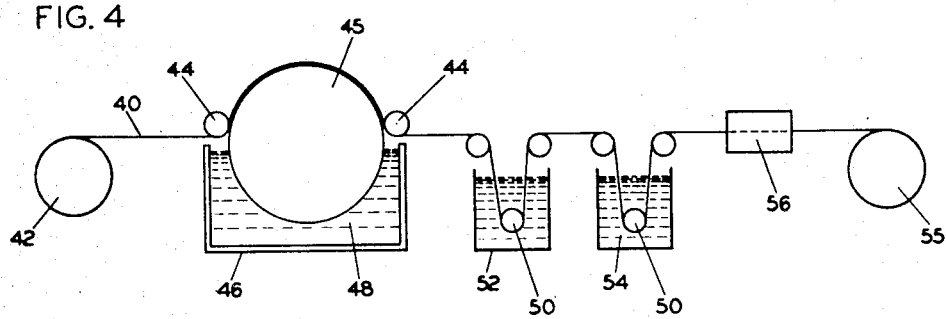
Fig. 4 shows diagrammatically apparatus suitable for use in regenerating a surface layer of the supporting sheet.

The surface conversion or regeneration process of the invention may be carried out in various ways, and an example of apparatus suitable for the purpose is shown somewhat diagrammatically in Fig. 4. Plastic sheet or film 40 to be converted is passed from supply roll 42 and guided by means of rollers 44 over drum 45, which dips into tank 46 containing hydrolyzing solution 48. Drum 45 is preferably provided with a surface coating of porous material which is adapted to take up solution 48 but which will not be affected thereby. The size and speed of rotation of said drum may be determined and controlled by the time necessary to regenerate a sufficient amount of material on the surface of sheet 40. This time is in turn dependent upon the temperature and concentration of solution 48.

The extent to which the surface of sheet 40 is converted should be controlled rather carefully. It has been found that preferred results for the purposes of the invention are obtained if the conversion be only partial. In other words, the preferred product of the conversion process of the invention is a sheet of substantially non-hydrophilic material having part of the material on one surface regenerated to hydrophilic material but with the regenerated portions or areas interspersed in substantially mosaic fashion with the unregenerated portions or areas of the material forming the body of the sheet. If this condition is brought about, it will be found that a better bond is obtained when a sheet of hydrophilic material is laminated to the treated surface, for it appears that the unconverted surface material bonds integrally to the converted portions and that the latter in turn bond to the additional sheet. It is to be understood, however, that this condition is merely one which appears preferred, and that the invention is not to be construed as limited thereto.

It will be apparent that control of the conversion process of the invention to bring about the above preferred results depends both upon the materials being treated and upon the hydrolyzing solution being used. Two examples will be given, but it is to be understood that they are given only by way of illustration and that the invention is in no way limited thereto.

If sheet 40 is composed of cellulose acetate, a suitable hydrolyzing agent is a solution of ten parts by weight of sodium hydroxide and twenty parts by weight of water. To this there may be added, if desired, one part by weight of methanol, and with such a solution a sufficient time of treatment is approximately one minute at room temperature. If sheet 40 is composed of polyvinyl acetal, a suitable hydrolyzing agent is a solution of equal parts of concentrated sulphuric acid and water, and in this case a sufficient time of treatment is approximately ten minutes at room temperature.

When regeneration of a sufficient layer on the surface of sheet 40 is completed, the sheet should be thoroughly washed, and at the same time any of the hydrolyzing solution remaining thereon should be neutralized. Convenient apparatus for this purpose is indicated in Fig. 4 as comprising tanks 52 and 54, through which sheet 40 is guided by means of idler rolls 50. Tank 52 will preferably contain a solution adapted to neutralize the hydrolyzing agent used in tank 46. For example, in the case of cellulose acetate, a satisfactory neutralizing solution will be a 2% solution of sulphuric acid, and in the case of polyvinyl acetal, tank 52 may contain a 5% solution of sodium bicarbonate. Tank 54 will preferably contain water through which sheet 60 may be passed for washing before reaching take-up roll 55. It will be apparent that if desired there may be provided additional washing means and/or suitable drying means such as oven 56 or ventilating means between tank 54 and roll 55. Such modifications will be apparent to those skilled in the art, and are to be construed as coming within the scope of the invention.

When the sheet of non-hydrophilic material has completed the treatment outlined in connection with Fig. 4, the next step of the process of the invention is to coat the converted or regenerated surface with a water solution of polyvinyl alcohol. The proportions of such solution are in no way critical, and an example of a suitable range is one part of polyvinyl alcohol to form five to ten parts of water. The solution may be applied in any convenient manner, preferably depending upon its viscosity. For example, it may be applied by means of apparatus similar to drum 45 and tank 46 in Fig. 4. If both surfaces are to be coated as for use in the preparation of a sheet such as sheet 30 shown in Fig. 3, the coating may be applied by dipping in polyvinyl alcohol solution. Alternatively, a spray method may be used, or if the solution is relatively viscous it may be applied by means of a doctor knife. It will be apparent that the more viscous the solution, the less time is necessary for drying. It will be apparent that the latter operation will be facilitated if desired by any suitable means such as oven 56 or ventilating means between tank 46 and take-up roll 55. It should also be pointed out that the thickness of the polyvinyl alcohol coating is not particularly critical. It should preferably be relatively thin, for example of the order of .0001 of an inch.

Figure 5:
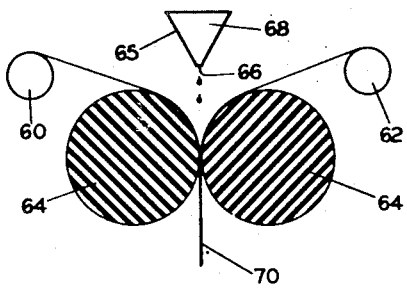
Fig. 5 shows diagrammatically apparatus suitable for laminating the various parts of the composite sheet.

When a sheet of non-hydrophilic material has completed the treatment outlined above, it may then be laminated to a sheet of hydrophilic material such as polyvinyl alcohol in the manner indicated diagrammatically in Fig. 5. For example, element 60 in Fig. 5 represents a roll of surface-converted and coated plastic such as cellulose acetate, and element 62 a roll of polyvinyl alcohol which has preferably already been subjected to the desired stretching operation. The sheets from rolls 60 and 62 are passed between a pair of pressure rollers 64 of rubber or other suitable material, and there may be provided suitable means for applying a laminating solution to the adjacent surface of the two sheets just before they have passed between rollers 64. As shown in Fig. 5, this may comprise a trough 65 provided with a suitable aperture 66 along its bottom edge and filled with a laminating solution 68. Laminated sheet 70 emerging from between rollers 64 may be considered as corresponding to sheet 10 already described and shown in Fig. 1.

In carrying out the laminating step illustrated in Fig. 5, considerable latitude may be allowed in the choice of a laminating solution. For example, water alone may be used, or a water solution, preferably relatively dilute, of polyvinyl alcohol. Preferred results are obtained, however, by using a solution of water and some non-solvent of polyvinyl alcohol, such for example as methanol. The proportion of the latter to the water in the solution may also be varied to a considerable extent, with the preferred range being of the order of 40-60% methanol to 60-40% water. Many other variations will, however, be apparent to those skilled in the art, and are to be construed as coming within the scope hereof.

Since certain changes may be made in the above product without departing from the scope of the invention herein involved, it is intended that all matter contained in the above description or shown in the accompanying drawing shall be interpreted as illustrative and not in a limiting sense.

What is claimed is:

1. As a new article of manufacture for use in the formation of stereoscopic light-polarizing images in terms of dichroic dyes and stains, a sheet of substantially non-hydrophilic organic plastic material, at least two opposed surfaces of said sheet each having a plurality of superimposed layers of polyvinyl alcohol supported thereon and structurally integral therewith, the surfaces of said plastic sheet adjacent to said superimposed layers comprising a predetermined amount of regenerated cellulose, each of the two outer polyvinyl alcohol layers being molecularly oriented with the directions of molecular orientation in said layers at right angles to each other whereby to possess the property of absorbing and orienting dichroic dyes and stains used in the production of dichroic light-polarizing images of the character which oppositely polarize light, and each of the other of said polyvinyl alcohol layers having its molecules heterogeneously arranged.

2. An image-carrying element adapted to have images, designs and the like formed therein and having an outer layer possessing the property of absorbing and orienting dichroic dyes and stains used in the production of light-polarizing images, comprising in combination, a flexible support formed of a sheet of cellulose acetate, and, structurally integral therewith, at least two flexible layers of polyvinyl alcohol positioned in superimposed relation to each other on at least one surface of said cellulose acetate support, the surface of said cellulose acetate support adjacent the superimposed layers of polyvinyl alcohol comprising a predetermined amount of regenerated cellulose, the outermost of said polyvinyl alcohol layers having its molecules oriented substantially in parallelism whereby dichroic light-polarizing images in terms of dichroic dyes and stains may be formed in said layer and the other of said polyvinyl alcohol layers having the molecules thereof heterogeneously arranged.

FREDERICK J. BINDA.

REFERENCES CITED

The following references are of record in the file of this patent:

UNITED STATES PATENTS

| Number | Name | Date |
|---|---|---|
| Re. 21,904 | Land | Sept. 23, 1941 |
| 2,219,447 | Groff | Oct. 29, 1940 |
| 2,284,590 | Rogers | May 26, 1942 |
| 2,263,249 | Rogers | Nov. 18, 1941 |
| 2,158,130 | Land | May 16, 1939 |
| 2,276,151 | Brandenberger | Mar. 10, 1942 |
| 2,280,055 | Andersen | Apr. 21, 1942 |
| 1,768,795 | Sheppard et al. | July 1, 1930 |
| 2,289,715 | Land | July 14, 1942 |
| 2,315,373 | Land | Mar. 30, 1943 |
| 2,237,567 | Land | Apr. 8, 1941 |

FOREIGN PATENTS

| Number | Country | Date |
|---|---|---|
| 494,929 | British | Nov. 3, 1938 |